United States Patent Office 3,143,468
Patented Aug. 4, 1964

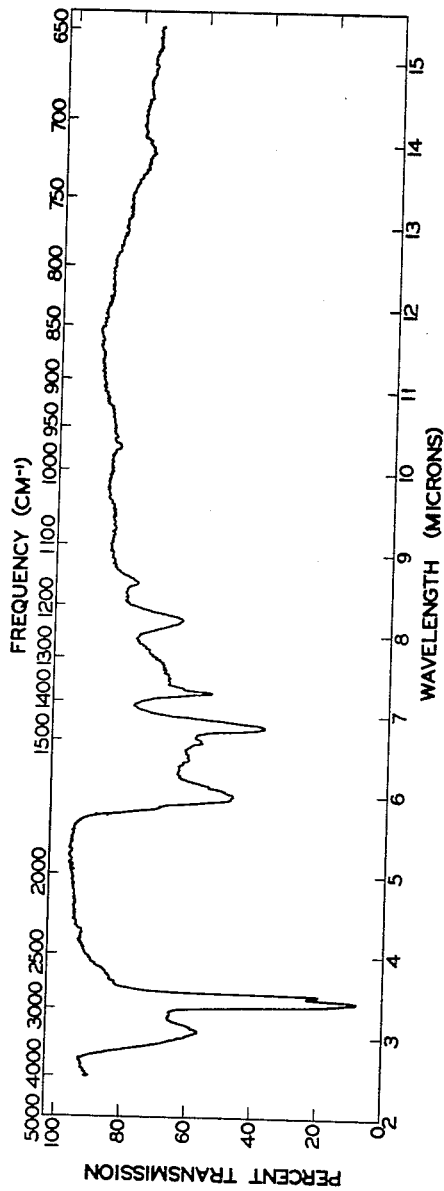

3,143,468
CAPREOMYCIN AND ITS PREPARATION
Earl B. Herr, Jr., Robert L. Hamill, and James M. McGuire, Indianapolis, Ind., assignors to Eli Lilly and Company, Indianapolis, Ind., a corporation of Indiana
Filed May 25, 1962, Ser. No. 197,658
11 Claims. (Cl. 167—65)

The present application is a continuation-in-part of our application Serial No. 850,376, filed November 2, 1959, now abandoned.

This invention relates to novel organic compounds. More particularly it relates to a novel nitrogenous organic base, to acid addition salts thereof, and to processes for their preparation.

The novel base described herein has been variously referred to as caprolin and capromycin, but has now received the generic or common name of capreomycin, by which it is designated herein. Capreomycin is a white solid characterized as follows: It is highly soluble in water, but relatively insoluble in most organic solvents. For example, it is relatively insoluble in lower ketones such as acetone and methyl isobutyl ketone, in alcohols such as methanol, ethanol, and butanol, in esters such as amyl acetate, and in ethers such as diethyl ether. Furthermore, it is relatively insoluble in such other organic solvents as pyridine, halogenated hydrocarbons, benzene, and aliphatic hydrocarbons.

The free base of capreomycin is relatively stable in aqueous solutions over a pH range of about 4 to about 8, but is unstable in strongly acidic and strongly basic solutions. Generally speaking, capreomycin is more stable in acidic solutions than in basic solutions.

An electrometric titration of capreomycin in dimethylformamide-water solution (2:1 parts by volume) shows the presence of titratable groups having pK'a values of about 6.5, 8.0, 10.0, and 13.0.

The apparent molecular weight of capreomycin is about 740 as determined from electrometric titration data.

A solubility analysis of capreomycin as the tetrahydrochloric acid addition salt in anhydrous methanol shows it to be soluble to the extent of 6.6 mg./ml. at 26° C. By the term "tetrahydrochloric acid addition salt" as employed herein is meant capreomycin tetrahydrochloride.

A sample of capreomycin tetrahydrochloride was dried for 16 hours in vacuo at room temperature over anhydrous calcium sulfate and was then dried for an hour in vacuo at 100° C. over phosphorus pentoxide. Analysis of the dried material showed it to have approximately the following elemental percentage composition: carbon, 36.46; hydrogen, 5.89; nitrogen, 21.93; oxygen, by direct determination, 18.56; chlorine, 16.71. These values, adjusted to the free base, indicate the following approximate elemental percentage composition for capreomycin: carbon, 44.31; hydrogen, 6.58; nitrogen, 26.60; oxygen, 22.49 percent.

The infrared absorption curve of capreomycin dihydrochloride in mineral oil mull is shown as FIGURE I. The distinguishable bands in the infrared absorption spectrum over the range of 2.0μ to 15.0μ are as follows: 3.10, 6.00, 6.65, and 8.15.

Ultraviolet absorption spectra of capreomycin show intense absorption maxima at about 268 mμ in 0.03 N hydrochloric acid with an extinction coefficient, $E_{1\ cm.}^{1\%}$ of 269 and at about 283 mμ in 0.05 N potassium hydroxide with an extinction coefficient, $E_{1\ cm.}^{1\%}$ of 175

The specific optical rotation of a sample of capreomycin disulfate dried in vacuo over anhydrous calcium sulfate for 16 hours at room temperature is $[\alpha]_D^{25} = -27.6°$ in 1 percent aqueous solution (weight per volume).

Following standard amino acid analysis procedures, including the procedure described by Moore and Stein in J. Biol. Chem. 192, 663 (1951), analyses of hydrolysates of capreomycin provided by hydrolysis with 5.7 N hydrochloric acid at 100° C. show the presence of several amino acid residues. The great variation in the ease with which different peptide bonds undergo hydrolytic cleavage and the differences in stability of the various amino acids present in the acid hydrolysates impose unavoidable limitations upon the accuracy with which quantitative determinations of the amino acid residues present in such acid hydrolysates can be carried out. Bearing in mind such limitations, and assuming a molecular weight of about 740, preliminary amino acid determinations indicate that each molecule of capreomycin contains at least one unit of each of the following amino acids: alanine, serine, 2,3-diaminopropionic acid, β-lysine, and a basic amino acid which appears to have been previously unknown. The best available evidence, including titration data, chemical tests, and nuclear magnetic resonance spectra, indicates that the new basic amino acid is α-(2-iminohexahydro-4-pyrimidyl)glycine. This structure has not yet, however, been confirmed by synthesis, and it is to be understood that slight modification of the proposed structure may be required as further data, including the synthetic work, are accumulated. Analyses carried out to date have given no evidence of the presence in capreomycin of the aromatic amino acids, the sulfur-containing amino acids, or the "acidic" amino acids (those containing multiple carboxylic acid groups).

Chemical tests made on capreomycin gave the following results: The ninhydrin test for presence of α-amino groups was positive. The Lowry [J. Biol. Chem., 193, 265 (1951)] and the Folin-Ciocalteau protein tests were positive. The anthrone, Bial, and Tauber saccharide tests were negative, as was the Ehrlich indole test. The hydroxamic acid test for ester groups as described in the J. Biol. Chem., 159, 21 (1945) was also negative.

As is the case with many polypeptide antibiotics, capreomycin, as normally obtained from the fermenter, comprises a number of closely related components, which will be referred to herein as capreomycin I, capreomycin II, capreomycin III, etc. The principal component is capreomycin I, but individual lots of capreomycin have been observed to contain up to about 20 percent of capreomycin II, which insofar as its chemical and physical properties are concerned, differs significantly from capreomycin only in its specific rotation and its behavior on chromatography in a solvent system composed of 15 parts of n-propanol, 10 parts of pyridine, 3 parts of glacial acetic acid, and 12 parts of water. The specific rotation of the disulfate salt of capreomycin II in 1 percent aqueous solution is $[\alpha]_D^{25} = +2.5°$. The antibiotic spectrum of capreomycin II is essentially identical to that of capreomycin; its toxicity, however, is only about one-third that of capreomycin. Capreomycin III is detectable by paper chromatography in certain solvent systems but appears to be present in very small quantities. The term "capreomycin" as employed herein without additional qualification refers to the antibiotic as normally obtained from the fermentation and comprises essentially a combination of capreomycin I and capreomycin II, and possibly additional components of the capreomycin class in lesser proportions. The marked similarity in properties observed in the components comprising capreomycin suggests the possibility that the substances are disastereoisomers. It should be understood, however, that with the presently available evidence, this cannot be stated categorically, but is offered merely as a plausible explanation of the observed properties.

Capreomycin has an inhibitory action against growth of certain microbial organisms, including both gram-positive and gram-negative bacteria. The levels which show inhibition against the growth of illustrative organisms are numerically set forth in Table I. The inhibitory levels were determined by the agar-dilution test, or by the broth-dilution test (identified in the table by the letters "ad" and "bd," respectively).

In the agar-dilution test, the test organism is streaked or implanted on a series of agar plates containing various concentrations of capreomycin in the agar to determine the minimum concentration of capreomycin in mg./ml. (micrograms per milliliter) which inhibits the growth of the organism over a period of 48 hours.

In the broth-dilution test, a series of tubes containing nutrient broth having various concentrations of capreomycin are inoculated with the test organism to determine the minimum concentration of capreomycin in mcg./ml. in the broth substrate which inhibits organism growth over a period of about 24 hours.

TABLE I

| Test Organism | Minimum Inhibitory Concentration (mcg./ml.) | |
|---|---|---|
| Bacteria: | | |
| Staphylococcus aureus | 100 | ad |
| Staphylococcus albus | 100 | ad |
| Bacillus subtilis | 25 | ad |
| Sarcina lutea | >100 | ad |
| Mycobacterium phlei | 1.56 | ad |
| Mycobacterium tuberculosis (607) | 6.25 | ad |
| Mycobacterium tuberculosis (607, Streptomycin resistant) | 3.1 | ad |
| Mycobacterium avium | 6.25 | ad |
| Mycobacterium avium (Streptomycin resistant) | 1.56 | ad |
| Escherichia coli | >100 | ad |
| Proteus vulgaris | 100 | ad |
| Aerobacter aerogenes | 100 | ad |
| Klebsiella pneumoniae | 100 | ad |
| Salmonella enteritidis | >100 | ad |
| Shigella paradysenteriae | 100 | ad |
| Salmonella typhimurium | 125 | bd |
| Salmonella pullorum | 62.5 | bd |
| Salmonella typhosa | 125 | bd |
| Salmonella berta | 125 | bd |

It is apparent from the above table that capreomycin and its acid addition salts are useful in the treatment of bacterial infections encountered in the veterinary field. For example, the compounds are effective in the treatment of diseases produced by Salmonella organisms. Specifically, the subcutaneous administration of capreomycin in doses of about 400 mg. per kilogram of body weight is effective in controlling Salmonella typhimurium infections in experimental mice. Likewise, effective control of Salmonella pullorum infections is attained by injecting day-old chicks with about 1 to 5 mg. of capreomycin per bird.

The compounds are also effective in killing houseflies on contact. A suitable preparation for this purpose is an aqueous solution containing about 0.4 percent by weight of capreomycin either as the free base or as a water-soluble acid addition salt.

The compounds exhibit hypotensive activity in the standard pharmacological test employing anesthetized dogs.

Capreomycin and its acid addition salts when given by subcutaneous injection to mice have in vivo antimicrobial action against infectious organisms, the $ED_{50}$ values (effective dosage to protect 50 percent of the test animals) in illustrative infections being as follows when two doses are employed: Streptomycetes pyogenes, 250 mg./kg.; Proteus vulgaris, 84 mg./kg.; Salmonella typhosa, 90 mg./kg.; and Klebsiella pneumoniae, 30 mg./kg.

Additionally, capreomycin has in vivo activity in mice against experimentally induced tuberculosis infections. For example, it is active against Mycobacterium tuberculosis var. hominis (Strain H37RV) infections in mice when administered subcutaneously or orally. Given subcutaneously, it is effective in dosages comparable to those in which presently used antitubercular antibiotics, such as streptomycin, are effective.

Capreomycin can be produced by culturing a hitherto unknown organism, which has been given the name Sterptomyces capreolus, under aerobic conditions in a culture medium containing assimilable sources of carbon, nitrogen, and inorganic salts. The organism was first isolated from a soil sample. Portions of the soil sample were suspended in sterile distilled water and the suspensions were streaked on nutrient agar plates. The seeded nutrient agar plates were incubated at about 25–35° C. for several days. At the end of the incubation time, colonies of the capreomycin-producing organisms were transferred with a sterile platinum loop to agar slants. The inoculated agar slants were incubated to provide larger amounts of inoculum for the production of capreomycin.

The novel organism capable of producing capreomycin has been placed on permanent deposit with The Culture Collection of the Northern Utilization Research and Development Branch of the United States Department of Agriculture at Peoria, Illinois, and has been assigned the culture number NRRL 2773.

The newly discovered organism is similar in some respects to previously described Streptomyces species, viz., Streptomyces canescus (NRRL 2419) and Streptomyces sindenensis (NRRL B1816, members of the Rectus flexibilis section—Olive Buff series, as described by Pridham et al. in Applied Microbiology 6, 52 (1958). It is believed to be closer to the above S. canescus and S. sindenensis in characteristics than to any other heretofore described organism. However, there are too many dissimilarities between NRRL 2773 and these previously described Streptomyces species to permit classification of NRRL 2773 as a strain of either S. canescus or S. sindenensis. Therefore, the new NRRL 2773 organism is designated as a new species, Streptomyces capreolus.

The S. canescus and S. sindenensis organisms have been cultured in the media preferred in the practice of this invention and described herein, but no detectable amounts of capreomycin have ever been observed in the fermentation products obtained thereby.

The detailed description contained herein will be made with particular reference to the newly found organism, NRRL 2773. However, it is to be understood that the production of capreomycin by the growing of other capreomycin-producing organisms or mutants of capreomycin-producing organisms including mutants of NRRL 2773 are within the scope of this invention. Such other organisms, strains, or mutants can be produced by known procedures, as by subjecting a capreomycin-producing organism to X-ray or ultraviolet irradiation, or to chemical agents, for example, the nitrogen mustards.

In the following paragraphs are set forth the results of a detailed taxonomic study of the new organism S. capreolus NRRL 2773. The colors used in the description are in accordance with the definitions used in Maerz and Paul, Dictionary of Color (1950).

MICROSCOPIC MORPHOLOGY

*Tomato paste-oatmeal agar (14 days at 30° C.).*—Colonies produced straight or flexuous sporophores and cylindrical conidia. Conidia measured 1.0 to 1.2µ in diameter and 3.0 to 4.8µ in height.

*Hickey and Tresner's agar (14 days at 30° C.).*—Microscopic morphology like that observed on tomato paste-oatmeal agar.

*Salts-starch agar (14 days at 30° C.).*—Microscopic morphology like that observed on tomato paste-oatmeal agar.

Cultural Characteristics

*Czapek's agar (14 days at 30° C.).*—Growth fair. Fair amount of aerial mycelium, white and very scant sporulation. Reverse orange-brown to red-brown. No soluble pigments.

*Glucose-asparagine agar (14 days at 30° C.).*—Growth moderate. Sparse, pale tan (Pl. 10–2B) aerial mycelium. Sparse sporulation, reverse red-brown. Pale brown soluble pigment.

*Inorganic salts-starch agar (14 days at 30° C.).*—Growth moderate. Fair, near white aerial mycelium, reverse red-brown. Pale red-brown soluble pigment.

*Tomato paste-oatmeal agar (14 days at 30° C.).*—Growth moderate. Fair, pale tan (Pl. 9–2C to Pl. 11–2C) aerial mycelium, moderate sporulation, reverse brown. Pale brown soluble pigment.

*Emerson's agar (14 days at 30° C.).*—Moderate growth. Scant, white aerial mycelium. No sporulation. Reverse red-brown. Pale brown soluble pigment.

*Potato plug agar (14 days at 30° C.).*—No growth to excellent growth of vegetative mycelium depending on potato source. No visible aerial mycelium. Reverse pale orange and vegetative growth slightly darkens potato plugs.

*Tyrosine agar (14 days at 30° C.).*—Fair growth. Aerial mycelium near white. Reverse light brown. Pale brown soluble pigment.

PHYSIOLOGY $H_2S$ production: none observed on peptone-iron agar with added yeast extract.
Gelatin liquefaction: moderate, with production of a red-brown soluble pigment.
Nitrate reduction: no reduction in organic broth; slight reduction in synthetic broth.
Starch hydrolysis: only partial hydrolysis after 14 days.
Skim milk: neither coagulation nor peptonization occurred in 14 days. Orange-brown ring, no pellicle. Slight increase in pH.

In Table II are set forth the results of carbon utilization tests carried out on organism NRRL 2773. In the table, the following symbols are employed:

+ = growth and utilization
− = no apparent growth or utilization

TABLE II

*Carbon Utilization Pattern for NRRL 2773*

| Compound | Growth Response | Compound | Growth Response |
|---|---|---|---|
| L(+) arabinose | + | Lactose | − |
| D(+) glucose | + | D(+) raffinose | − |
| D(−) fructose | + | Inulin | − |
| i-Inositol | + | Mannitol | − |
| Maltose | + | Salicin | − |
| Mannose | + | Sorbitol | − |
| D(+) xylose | − | Cellulose | − |
| L(+) rhamnose | − | D ribose | − |
| Sucrose | − | D(+) trehalose | − |

The cultural medium employable in producing capreomycin by cultivation of NRRL 2773 can be any one of several media since, as is apparent from the above-described utilization tests, the organism is capable of utilizing different energy sources. However, for economy of production, maximum yield of antibiotic, and ease of isolation of the antibiotic, certain culture media containing relatively simple nutrient sources are preferable. For example, the media which are useful in the production of capreomycin include an assimilable source of carbon such as glucose, fructose, maltose, mannose, soluble starch, molasses, dextrin, brown sugar, corn steep solids, and the like. The preferred source of carbon is glucose. Additionally, employable media include a source of assimilable nitrogen such as oatmeal, beef extract, peptones (meat or soy), hydrolyzed casein, yeast, amino acid mixtures, and the like. Presently preferred sources of nitrogen are peptones, hydrolyzed casein, and beef extracts.

Mineral salts, for example those providing calcium, magnesium, sodium, potassium, chloride, sulfate, and carbonate ions, and a source of growth factors, such as yeast or yeast extract, can be incorporated in the media with beneficial results.

As is necessary for the growth and development of other microorganisms, essential trace elements should also be included in the culture medium for growing the actinomycete employed in this invention. Such trace elements are commonly supplied as impurities incidental to the addition of the other constituents of the medium.

The initial pH of the culture medium can be varied widely. However, it has been found desirable that the initial pH of the medium be between about 5.5 and about 8.0, and preferably about 6.5 to about 7.0. As has been observed with other actinomycetes, the pH of the medium gradually increases throughout the growth period of the organism while capreomycin is being produced, and may attain a level from about 7.2 to about 8.0 or above, the final pH being dependent at least in part on the initial pH of the medium, the buffers present in the medium, and the period of time the organism is permitted to grow.

Submerged, aerobic cultural conditions are the conditions of choice for the production of capreomycin. For preparation of relatively small amounts, shake flasks and surface culture in bottles can be employed; but for the preparation of large amounts, submerged aerobic culture in sterile tanks is preferred. The medium in the sterile tank can be inoculated with a sporulated suspension; but because of the growth lag experienced when a sporulated suspension is used as the inoculum, the vegetative form of the culture is preferred. By thus avoiding the growth lag, more efficient use of the fermentation equipment is realized. Accordingly, it is desirable first to produce a vegetative inoculum of the organism by inoculating a relatively small quantity of culture medium with the spore form of the organism, and when a young active vegetative inoculum has been obtained, to transfer the vegetative inoculum aseptically to the large tank. The medium in which the vegetative inoculum is produced can be either the same as or different from the medium utilized for the large scale production of capreomycin.

The organisms grow best at temperatures in the range of about 28° C. to about 37° C. Optimal capreomycin production appears to occur at a temperature of about 29–33° C.

As is customary in aerobic submerged culture processes, sterile air is blown through the culture medium. For efficient growth of the organism and capreomycin production, the volume of air employed in the tank production of capreomycin preferably is upwards of 0.1 volume of air per minute per volume of culture medium. Efficient growth and optimal yields of capreomycin are obtained when the volume of air used is at least one volume of air per minute per volume of culture medium.

The concentration of capreomycin activity in the culture medium can readily be followed during the fermentation period by testing samples of the culture medium for their inhibitory activity against the growth of an organisms known to be inhibited in the presence of capreomycin. The use of the organism *Klebsiella pneumoniae* has been found to be suitable for this purpose. The testing can be carried out by the known turbidimetric or cup-plate methods.

In general, maximum production of the antibiotic occurs within about four to seven days after inoculation of the culture medium when submerged aerobic culture or shake flask culture is employed, and within about five to ten days when surface culture is used.

The mycelium and undissolved solids are removed from the fermentation broth by conventional means such as filtration or centrifugation. The antibiotic is contained in the filtered broth and can be removed therefrom by employing adsorption techniques. The various adsorbents which can be employed include carbon adsorbents and ion exchange resins of an acidic character, a suitable resin being "Dowex 50" (a sulfonated polystyrene-type resin sold by the Dow Chemical Company).

Employing the carbon adsorption procedure, capreomycin can be recovered by adding an activated carbon adsorbent, for example, "Darco G-60" (sold by Atlas Powder Company), to the filtered broth with stirring. The carbon mixture is stirred for a time sufficient to permit efficient adsorption of capreomycin on the carbon. Customarily, if about 2 to 5 parts of carbon per part of broth solids are added to the capreomycin-containing broth, a satisfactory removal of capreomycin from the broth is realized in about one to two hours. The carbon on which the antibiotic is adsorbed is removed from the mixture by filtration and is washed thoroughly to remove unadsorbed impurities. The antibiotic is then eluted from the washed carbon. It has been found that a combination of a dilute aqueous acid and a water-miscible organic solvent can be used effectively to remove the antibiotic from the carbon. For example, a solvent mixture of 80 parts by volume of 0.05 N hydrochloric acid and 20 parts by volume of acetone has been found effective for eluting capreomycin.

Alternatively, capreomycin can be removed from the filtered broth by contact with an acidic ion-exchange resin. The resin is customarily employed in salt form, such as in the sodium cycle. The adsorbed capreomycin can be eluted from the resin by elution with, for example, an aqueous solution of a soluble salt, such as a sulfate, a chloride, or a citrate salt solution. The salt employed can be triethylamine sulfate, sodium chloride, potassium chloride, sodium citrate, or the like.

The capreomycin eluates can be decolorized if desired by treatment with decolorizing carbon.

To obtain a relatively impure preparation of capreomycin, the above eluates can be merely evaporated to dryness. However, the eluates or the dry residue thereof can be subjected to further treatment for purification of the capreomycin. For example, the eluate provided by the carbon adsorption step can be evaporated to about one-fifth to one-tenth volume, thereby removing the acetone, and the capreomycin can be recovered from the aqueous concentrate by precipitation. The precipitation can be accomplished by the addition with stirring of an appropriate acid supplying an anion for the capreomycin salt in the presence of a water-miscible solvent such as methanol or acetone. A preferred precipitating agent is sulfuric acid in aqueous methanol.

For the precipitation, it has usually been found suitable to add 10 N sulfuric acid to the concentrated eluate containing capreomycin in the presence of methanol. Alternatively, the pH of the eluate can be adjusted to about pH 5–6 with sulfuric acid and the precipitation accomplished by adding the acidified eluate to methanol or acetone. The precipitated capreomycin, as its sulfuric acid addition salt, is removed by filtration or centrifugation, washed, and dried as desired. The capreomycin can be further purified by repeated precipitations with sulfuric acid. The precipitate of capreomycin sulfate can be further purified to provide a white solid by dissolving the precipitate in a minimum volume of water, then adding the solution to a large volume of a water-miscible solvent with stirring, e.g., to 10 to 30 volumes of methanol, whereupon precipitation of capreomycin sulfate occurs. The white solid precipitate is removed and dried as desired.

The free base of capreomycin can be obtained from the acid addition salt form of capreomycin as provided by the above procedures by dissolving a quantity of the acid addition salt in water, neutralizing the solution, and clarifying the neutralized solution by filtration. The filtered solution of the capreomycin salt can be passed over a column of a basic resin in the hydroxyl cycle, for example, "Dowex-1" (a strongly basic anion exchange resin of the styrene-divinylbenzene copolymer type having quaternary amino groups, sold by the Dow Chemical Company). This procedure liberates the capreomycin and allows it to pass through the column as the free base. The free base can be recovered as a dry, white solid by freeze-drying the effluent.

Other acid addition salts of capreomycin in addition to such inorganic acid addition salts as mentioned above can be prepared. Organic acids in addition to inorganic acids can be used in preparing salts of capreomycin, for example, picric acid, p-(2-hydroxy-1-naphthylazo)benzenesulfonic acid, acetic acid, and the like. The desired salt can usually be obtained by adding at least one molecular equivalent of the appropriate acid for each mole of dissolved capreomycin to a water solution of the free base of capreomycin. If an excess of acid is employed, customarily four equivalents of acid are consumed in providing the salt, e.g., an excess of hydrochloric acid will provide the tetrahydrochloride addition salt. It is apparent that salts containing one, two, or three equivalents of acid can be provided by proper adjustment of the quantity of acid added. In the event that the desired acid addition salt does not precipitate readily, the precipitation can be aided, as by evaporating the solution to a smaller volume, or by adding a water-miscible solvent, for example, methanol or acetone.

Capreomycin I free of capreomycin II can be prepared by further treatment of an acid addition salt of capreomycin. Thus, for example, an aqueous solution of a salt of capreomycin, such as, for example, the disulfate, is prepared, and after adjustment of the solution to about pH 7.5 with a base, such as sodium hydroxide, the solution is passed through a column containing an acidic resin, for example "Dowex 50–W" in the acid cycle. The column is then washed successively with water, a one percent aqueous solution of triethylamine sulfate adjusted to about pH 10, and finally a three percent aqueous solution of triethylamine sulfate adjusted to about pH 10. The capreomycin II begins to appear in the effluent in the final fractions of the one percent triethylamine sulfate wash and continues into the first portion of the three percent wash, and is followed in later fractions of the three percent wash by capreomycin I which is free of capreomycin II. The progress of the elution can be followed by paper chromatography and microbiological assay of the fractions obtained from the column. Elution of the capreomycin II-free capreomycin I is completed by washing the column with a four percent solution of triethylamine sulfate adjusted to about pH 10. The pH of the effluent containing capreomycin I free of capreomycin II is adjusted to about pH 5 to 6 with sulfuric acid. Concentration of the solution to about one-tenth volume, followed by addition of about four volumes of a water-miscible organic solvent such as methanol, acetone, and the like, precipitates capreomycin I disulfate free of any detectable amount of capreomycin II.

This invention is further illustrated by the following specific examples:

EXAMPLE 1

Preparation of Capreomycin

A culture of NRRL 2773 is produced by growing the organism on a nutrient agar slant having the following composition:

OATMEAL-TOMATO PASTE AGAR

| | G. |
|---|---|
| Tomato paste | 20 |
| Pre-cooked oatmeal | 20 |
| Agar | 15 |

Tapwater, added to make a final volume of 1 l.

The slant is inoculated with spores of NRRL 2773 and is incubated for 10 days at about 30° C. The culture growth on the slant is covered with 6 ml. of nutrient broth, and the slant is scraped gently to remove the organisms to provide an aqueous suspension.

Two milliliters of the suspension so obtained are used for inoculating under aseptic conditions an 80-ml. portion of a sterile vegetative culture medium having the following composition:

YEAST I MEDIUM

| | | |
|---|---|---|
| Glucose | g | 15 |
| Yeast | g | 15 |
| Calcium carbonate | g | 1 |
| Tap water | ml | 1100 |

The inoculated vegetative medium is incubated at about 28° C. for 48 hours, during which time the flasks are shaken at the rate of 250 cycles per minute on a rotary shaker having a 1-inch stroke.

Five milliliters of the vegetative inoculum are used to inoculate aseptically 100-ml. portions of the following sterilized production medium contained in 500-ml. Erlenmeyer flasks:

| | | |
|---|---|---|
| Glucose | g | 25 |
| Peptones | g | 45 |
| Hydrolyzed casein | g | 4 |
| Blackstrap molasses | g | 10 |
| Calcium carbonate | g | 2 |
| Tap water | ml | 1100 |

The inoculated culture is incubated for six days at about 30° C. During the incubation period, the flasks are shaken at 250 cycles per minute on a rotary shaker having a 1-inch stroke. The pH of the starting medium is about pH 6.5. At the end of the incubation period, the pH of the medium increases to about pH 7.0.

The culture broth obtained is filtered to remove the mycelium and other undissolved solids. The filtered broth contains the capreomycin which was produced by the organism.

EXAMPLE 2

*Preparation of Capreomycin Disulfate*

A culture of NRRL 2773 is produced by inoculating a slant of the oatmeal-tomato paste agar described in Example 1 with spores of NRRL 2773 and incubating for nine days at a temperature of about 30° C. The growth on the slant is then covered with 5 ml. of nutrient broth, and the surface of the slant is scraped gently to remove the organisms and provide an aqueous suspension.

Employing aseptic techniques, the inoculum obtained from one 1-inch agar slant is used to inoculate a 2-liter Erlenmeyer flask containing a 500-ml. portion of a sterilized vegetative culture medium having the following composition:

| | | |
|---|---|---|
| Soluble starch | g | 10 |
| Peptones | g | 5 |
| Beef extract | g | 5 |
| Sodium chloride | g | 5 |
| Yeast extract | g | 2.5 |
| Tap water | ml | 1100 |

The incubation is carried on at 28° C. for 48 hours with shaking at 250 cycles per minute on a rotary shaker having a 1-inch stroke.

To produce a larger quantity of vegetative inoculum, 500 ml. of the vegetative inoculum is added aseptically to a stainless-steel 350-gallon fermentation tank containing 250 gallons of sterile medium having the following composition (weight/volume):

| | Percent |
|---|---|
| Glucose | 1.5 |
| Yeast | 1.5 |
| Antifoam ("Polyglycol No. 2000" sold by Dow Chemical Co.) | 0.02 |

The inoculum is allowed to grow for about 22 hours at a temperature of 30° C. Throughout the growth period, the medium is aerated with sterile air at the rate of 17 cubic feet per minute and is agitated with two 16-inch impellers rotating at 160 revolutions per minute.

To a 1700-gallon stainless steel fermentor are added 1100 gallons of a medium having the following composition (weight/volume):

PEPTONE NO. 159 MEDIUM

| | Percent |
|---|---|
| Glucose | 2.5 |
| Molasses | 1.0 |
| Peptones | 4.0 |
| Calcium carbonate | 0.2 |
| Hydrolyzed casein | 0.6 |
| Antifoam ("Polyglycol No. 2000" sold by Dow Chemical Co.) | 0.005 |

The medium after sterilization is inoculated with 100 gallons of the inoculum grown in the fermentation tank. The fermentation is carried on at 30° C. for about five days. The foam is controlled by the addition, when needed, of "Larex No. 1" (an antifoam product sold by Swift and Co.). Throughout the fermentation, the medium is aerated by the addition of sterile air at the rate of 96 cubic feet per minute and is agitated with two 22-inch impellers operated at 140 revolutions per minute. At the end of the fermentation, 240 pounds of "Dicalite 476" (a perlite filter product sold by Great Lakes Carbon Corporation) are added to 1,000 gallons or the antibiotic broth, and the mixture is stirred and filtered. The filter cake is washed with tap water and the wash water and the filtrate are combined to provide a total volume of 1,000 gallons. To 500 gallons of the combined liquids are added 132 pounds of "Darco G-60." The mixture is stirred thoroughly and filtered, and the filtrate is discarded. The carbon filter cake is washed with 200 liters of tap water, the wash water being discarded. The washed carbon cake on which the capreomycin is adsorbed is further washed with 200 liters of 0.05 N aqueous hydrochloric acid. The acid wash is discarded. The washed carbon cake is eluted during a one-hour period with 400 liters of an aqueous acetone mixture containing 1.65 liters of 11.7 N hydrochloric acid and 80 liters of acetone. The filter cake is further eluted by washing the cake with 200 liters of an aqueous acetone mixture containing 825 ml. of 11.7 N hydrochloric acid and 40 liters of acetone during a 15-minute period. The combined eluates, having a total volume of 575 liters, are concentrated in vacuo to 52.5 liters. The concentrate is added with stirring to 525 liters of acetone and the acetone mixture is permitted to stand overnight at room temperature, during which time an oily precipitate of capreomycin separates. The supernatant is decanted and discarded, and the oily precipitate which remains is dissolved in 20 liters of distilled water. The aqueous solution is concentrated in vacuo to 12 liters to remove any residual acetone. The aqueous concentrate containing capreomycin is filtered to remove a small amount of a precipitate, which is discarded. The filtrate containing the capreomycin is added to 240 liters of methanol with stirring. The methanolic solution of capreomycin is acidified by the addition of 1 liter of 10 N sulfuric acid, whereupon the precipitation of the sulfuric acid addition salt of capreomycin commences. The mixture is permitted to stand overnight for more complete precipitation. The supernatant is removed by decanting and filtering. The precipitate, consisting of the capreomycin disulfate, is washed with 10 liters of methanol and is dried in vacuo. Yield: 2510 g.

To provide the tetrahydrochloride salt of capreomycin, 11.7 N hydrochloric acid is used to acidify the methanolic solution of capreomycin in place of the 10 N sulfuric acid employed above.

EXAMPLE 3

*Preparation of Capreomycin Disulfate*

To 360 liters of filtered broth provided by the procedure described in Example 2, 585 g. of oxalic acid and 260 g. of sodium hydroxide dissolved in 3 liters of distilled water are added. The mixture is stirred thoroughly and filtered to remove any precipitate formed, which is discarded. The volume of the filtrate containing capreomycin is 317 liters. The filtrate is passed over a column of "Dowex 50," 2 percent cross linked, in the sodium cycle, in a column having a diameter of 4 inches and a height of 48 inches. The resin is washed in situ with 2 liters of distilled water. The adsorbed capreomycin is eluted from the resin by washing at a rate of 75 ml. per minute with 25 liters of a 20 percent aqueous solution of triethylamine sulfate adjusted to about pH 5 to 6 with sulfuric acid. "Darco G-60" (2.5 kg.) is then added to the eluate for decolorizing. After stirring the mixture for 15 minutes, 1 kg. of "Hyflo Supercel" (a diatomaceous earth filter aid sold by Johns-Manville Co.) is added thereto with stirring. The mixture is filtered and the filter cake is washed with 1 liter of distilled water. The filtrate and the wash are combined to provide a volume of 21.5 liters. The combined liquids containing capreomycin are added with stirring to 86 liters of methanol to bring about precipitation of the capreomycin. The mixture is permitted to stand overnight, during which time precipitation of capreomycin as the sulfuric acid addition salt occurs. The precipitate is removed by filtering and is washed with 12 liters of methanol. The precipitate is further washed with 7 liters of chloroform. The washed precipitate consisting of the capreomycin disulfuric acid addition salt is dried in vacuo at 35° C. Yield: 1.09 kg.

EXAMPLE 4

*Preparation of the Free Base of Capreomycin*

Three grams of the tetrahydrochloride salt of capreomycin are dissolved in 15 ml. of water. The solution is adjusted to about pH 7.0 with 1 N sodium hydroxide and is filtered to remove a small quantity of precipitate which appears. The filtrate, containing the capreomycin, is passed through a column 2 cm. in diameter by 30 cm. in height containing 100 to 200 mesh "Dowex 1" in the hydroxyl cycle, 8 percent cross linked. This treatment liberates capreomycin from its salt and permits its recovery from the effluent of the column as the free base. The column is washed with 350 ml. of water and the wash and effluent are combined and lyophilized to provide a dry, white solid consisting of the free base of capreomycin. Yield: 2.7 g.

The preparation has activity in the capreomycin assay using the organism *Klebsiella pneumoniae*.

EXAMPLE 5

*Preparation of the Picric Acid Addition Salt of Capreomycin*

One gram of the free base of capreomycin is dissolved in 10 ml. of distilled water. A 5 percent solution of picric acid (weight per volume) in 95 percent ethanol is added dropwise with stirring to the capreomycin solution until precipitation of capreomycin as the picric acid addition salt is complete. The yellow precipitate of the picrate is separated by filtration, washed, and dried in vacuo over anhydrous calcium sulfate. The dried salt shows activity against *Klebsiella pneumoniae* in the capreomycin assay. Yield: 1.7 g.

EXAMPLE 6

*Preparation of the p-(2-Hydroxy-1-Naphthylazo) Benzenesulfonic Acid Addition Salt of Capreomycin*

Three grams of the free base of capreomycin are dissolved in 8 ml. of water. A hot saturated aqueous solution of the sodium salt of p-(2-hydroxy-1-naphthylazo)benzenesulfonic acid is added dropwise with stirring to the capreomycin solution. The addition of the p-(2-hydroxy-1-naphthylazo)benzenesulfonic acid solution is continued until complete precipitation of the dissolved capreomycin as the p-(2-hydroxy-1-naphthylazo)benzenesulfonic acid addition salt is realized. The p-(2-hydroxy-1-naphthylazo)benzenesulfonic acid addition salt of capreomycin precipitates as a highly viscous, orange oil. The precipitate is separated by decanting the supernatant, and the separated precipitate is washed and is dried in vacuo over anhydrous calcium sulfate. The dried residue of the p-(2-hydroxy-1-naphthylazo)benzenesulfonic acid addition salt of capreomycin is an orange solid. It shows activity against *Klebsiella pneumoniae* in the capreomycin assay. Yield: 4.6 g.

EXAMPLE 7

*Preparation of Capreomycin I Free of Capreomycin II*

A solution of 2.5 kg. of capreomycin in 50 liters of water is prepared and the pH is adjusted to about 7.5 with sodium hydroxide. This solution is passed through a column 15.2 cm. in diameter by 142.2 cm. in height containing 200 to 400 mesh "Dowex-50W" in the hydrogen cycle. (This is a sulfonic acid resin, 2 percent cross-linked, available from Dow Chemical Company.) After the antibiotic has been adsorbed on the resin, the resin is washed with about four column volumes of water, the wash effluent being discarded. Elution of the antibiotic from the resin is started with about sixteen column volumes of 1 percent aqueous triethylamine sulfate adjusted to about pH 10. The column is then washed with about sixteen column volumes of 3 percent aqueous triethylamine sulfate adjusted to about pH 10, and finally with about twelve column volumes of 4 percent aqueous triethylamine sulfate adjusted to the same pH. The progress of the elution is followed by paper chromatography and microbiological assay, using *Klebsiella pneumoniae* as the assay organism, of the various fractions collected from the column. Capreomycin II begins to appear in the latter fractions of the 1 percent wash effluent and continues into the first portions of the 3 percent wash effluent. Capreomycin II, as so obtained, has pK'a values approximating 5.9, 7.4, 9.5, and 12.9 as determined by electrometric titration in dimethylformamide-water solution (2:1 parts by volume) and an apparent molecular weight around 740, as determined from the titration data. Its infrared spectrum, as a mineral oil mull of the free base, shows absorption maxima at about 3.00, 6.05, 6.43, 8.30, and 11.35 microns. In 0.03 N hydrochloric acid, capreomycin II exhibits an ultraviolet spectral absorption maximum at about 267 m$\mu$ with an extinction coefficient, $$E_{1\,cm.}^{1\%} \text{ of } 300$$

Its ultraviolet absorption maximum in 0.05 N potassium hydroxide solution is seen at about 272 m$\mu$ with an extinction coefficient, $$E_{1\,cm.}^{1\%} \text{ of } 183$$

The specific optical rotation, $[\alpha]_D^{25}$, of a 1% aqueous solution of the disulfate of capreomycin II is $+2.5°$. Capreomycin II, like capreomycin, gives a positive ninhydrin test and a negative Ehrlich indole test, and upon acid hydrolysis yields the same amino acids.

Capreomycin I free of capreomycin II is found in the subsequent fractions of the 3 percent wash effluent. The elution of capreomycin II-free capreomycin I is completed during the 4 percent wash.

The effluent fractions containing the capreomycin I free of capreomycin II are combined and the pH is adjusted to about pH 5 to 6 with sulfuric acid. Concentration to about one-tenth the original volume followed by the addition of about four volumes of methanol results in the precipitation of the disulfate of capreomycin I essentially free of capreomycin II. By similar treatment of the fractions containing capreomycin II, the disulfate of this factor is obtained.

Capreomycin I free of capreomycin II has pK'a values approximating 6.4, 7.9, 9.4, and 12.8 and an apparent molecular weight around 740 as determined by electrometric titration in 2:1 dimethylformamide-water solution. The results of chemical tests and acid hydrolysis are identical to those obtained with capreomycin and capreomycin II. Ultraviolet spectral absorption maxima are seen at about 267 m$\mu$ with an extinction coefficient, $$E_{1\,cm.}^{1\%}\ \text{of } 280$$

in 0.03 N hydrochloric acid and at about 282 m$\mu$ with an extinction coefficient, $$E_{1\,cm.}^{1\%}\ \text{of } 167$$

in 0.05 N potassium hydroxide solution. The disulfate salt of capreomycin I has a specific optical rotation in water, $[\alpha]_D^{25}$, of $-29.7°$ (c.=1) and a mineral oil mull thereof has infrared spectral absorption maxima at about 3.10, 3.70, 4.00, 5.95, 6.65, 7.58, 8.18, 9.2 (broad band), 10.35, and 11.9 microns.

We claim:

1. A method of producing capreomycin which comprises cultivating a capreomycin-producing strain of *Streptomyces capreolus* in a culture medium containing assimilable sources of carbon, nitrogen and inorganic salts, under submerged aerobic conditions until a substantial amount of capreomycin is produced by said organism in said culture medium.

2. A method according to claim 1 in which the organism is *Streptomyces capreolus* NRRL 2773.

3. A method according to claim 1 in which the culture medium is maintained at a temperature of about 28° C. to about 37° C., and the growth of the organism is carried out for a period of about four to about seven days.

4. A method of producing capreomycin which comprises cultivating a capreomycin-producing strain of *Streptomyces capreolus* in a culture medium containing assimilable sources of carbon, nitrogen and inorganic salts, under submerged aerobic conditions until a substantial amount of capreomycin is produced by said organism in said culture medium, and recovering the capreomycin from said culture medium.

5. A method for obtaining capreomycin I and capreomycin II as separate substances, which comprises cultivating a capreomycin-producing strain of *Streptomyces capreolus* in a culture medium containing assimilable sources of carbon, nitrogen, and inorganic salts, under submerged aerobic conditions until a substantial amount of capreomycin is produced by said organism in said culture medium, recovering the capreomycin from said culture medium, converting the capreomycin to a capreomycin acid addition salt, adsorbing the capreomycin from a solution of said salt upon an acidic resin, and selectively eluting capreomycin II and capreomycin I free of capreomycin II from the resin.

6. An antibiotic substance selected from the class consisting of capreomycin, prepared by the process of claim 4, and the salts thereof with pharmaceutically acceptable acids, said capreomycin being characterized as follows: a white, solid substance which is soluble in water; is relatively insoluble in most organic solvents; is stable in aqueous solution at a pH in the range of about 4 to about 8; has titratable groups of pK'a values approximating 6.5, 8.0, 10.0, and 13.0 as determined by electrometric titration in dimethylformamide-water solution (2:1 parts by volume); has an apparent molecular weight around 740 as determined from electrometric titration data; gives a positive ninhydrin test and a negative Ehrlich indole test; forms a dihydrochloride salt which, as a mineral oil mull thereof, has infrared spectral absorption maxima in the range of 2.0$\mu$ to 15.0$\mu$ at about the following wave lengths, expressed in microns: 3.10, 6.00, 6.65, and 8.15; has ultraviolet spectral absorption maxima in 0.03 N hydrochloric acid at about 268m$\mu$ with an extinction coefficient, $$E_{1\,cm.}^{1\%}\ \text{of } 269$$

and in 0.05 N potassium hydroxide solution at about 283m$\mu$ with an extinction coefficient, $$E_{1\,cm.}^{1\%}\ \text{of } 175$$

forms a disulfate salt which has an optical rotation in water, $[\alpha]_D^{25}$, of $-27.6°$ (c.=1, weight per volume), and yields, upon acid hydrolysis, at least about one molar proportion of each of five amino acids, including alanine, serine, 2,3-diaminopropionic acid, and $\beta$-lysine.

7. An acid addition salt of capreomycin, defined in claim 6.

8. The tetrahydrochloride of capreomycin, defined in claim 6.

9. The disulfate of capreomycin, defined in claim 6.

10. An antibiotic substance selected from the class consisting of capreomycin I, prepared by the process of claim 5, and the salts thereof with pharmaceutically acceptable acids, said capreomycin I being characterized as follows: a white, solid substance which is soluble in water; is relatively insoluble in most organic solvents; is stable in aqueous solution at a pH in the range of about 4 to 8; has titratable groups of pK'a values approximating 6.4, 7.9, 9.4, and 12.8 as determined by electrometric titration in dimethylformamide-water solution (2:1 parts by volume); has an apparent molecular weight around 740 as determined from electrometric titration data; gives a positive ninhydrin test and a negative Ehrlich indole test, forms a disulfate salt which, as a mineral oil mull thereof, has infrared spectral absorption maxima in the range of 2.0$\mu$ to 15.0$\mu$ at about the following wave lengths expressed in microns: 3.10, 3.70, 4.00, 5.95, 6.65, 7.58, 8.18, 9.2 (broad band), 10.35, and 11.9; has ultraviolet spectral absorption maxima in 0.03 N hydrochloric acid at about 267m$\mu$ with an extinction coefficient, $$E_{1\,cm.}^{1\%}\ \text{of } 280$$

and in 0.05 N potassium hydroxide solution at about 282m$\mu$ with an extinction coefficient, $$E_{1\,cm.}^{1\%}\ \text{of } 167$$

forms a disulfate salt which has an optical rotation in water, $[\alpha]_D^{25}$, of $-29.7°$ (c.=1, weight per volume); and yields, upon acid hydrolysis, at least about one molar proportion of each of five amino acids, including alanine, serine, 2,3-diaminopropionic acid, and $\beta$-lysine.

11. An antibiotic substance selected from the class consisting of capreomycin II, prepared by the process of claim 5, and the salts thereof with pharmaceutically acceptable acids, said capreomycin II being characterized as follows: a white, solid substance which is soluble in water; is relatively insoluble in most organic solvents; is stable in aqueous solution at a pH in the range of about 4 to 8; has titratable groups of pK'a values approximating 5.9, 7.4, 9.5, and 12.9 as determined by electrometric titration in dimethylformamide-water solution (2:1 parts by volume); has an apparent molecular weight around 740 as determined from electrometric titration data; gives a positive ninhydrin test and a negative Ehrlich indole test; has infrared spectral absorption maxima as a mineral oil mull of the free base thereof in the range of $2.0\mu$ to $15.0\mu$ at about the following wave lengths expressed in microns: 3.00, 6.05, 6.43, 8.30, and 11.35; has ultraviolet spectral absorption maxima in 0.03 N hydrochloric acid at about $267m\mu$ with an extinction coefficient, $$E_{1\,cm.}^{1\%} \text{ of } 300$$

and in 0.05 N potassium hydroxide solution at about $272m\mu$ with extinction coefficient, $$E_{1\,cm.}^{1\%} \text{ of } 183$$

forms a disulfate salt which has an optical rotation in water, $[\alpha]_D^{25}$, of $+2.5°$ (c.=1, weight per volume); and yields, upon acid hydrolysis, at least about one molar proportion of each of five amino acids, including alanine, serine, 2,3-diaminopropionic acid, and $\beta$-lysine.

References Cited in the file of this patent

UNITED STATES PATENTS 2,633,445    Marsh _____ Mar. 31, 1953

OTHER REFERENCES

Spector: Handbook of Toxicology, vol. II, pp. 143, 194–195 (1957).

Chem. and Eng. News, September 18, 1961, p. 27.

UNITED STATES PATENT OFFICE
CERTIFICATE OF CORRECTION

Patent No. 3,143,468                      August 4, 1964

Earl B. Herr, Jr., et al.

It is hereby certified that error appears in the above numbered patent requiring correction and that the said Letters Patent should read as corrected below.

Column 3, line 14, for "mg./ml." read -- mcg./ml. --; column 4, line 9, for "Sterptomyces", in italics, read -- Streptomyces --, in italics; line 30, for "(NRRL B1816," read -- (NRRL B1816), --; column 6, line 60, for "organisms" read -- organism --; column 10, line 31, for "or" read -- of --; column 14, line 69, after "to" insert -- about --; column 15, line 10, after "with" insert -- an --; column 16, line 13, for "p. 27" read -- p. 57 --.

Signed and sealed this 15th day of December 1964.

(SEAL)
Attest:

ERNEST W. SWIDER
Attesting Officer

EDWARD J. BRENNER
Commissioner of Patents